June 12, 1956  H. K. HIRASUNA  2,749,825
AUXILIARY MONITORING CONTROL ATTACHMENT FOR TRACTORS
Filed March 31, 1952  2 Sheets-Sheet 1
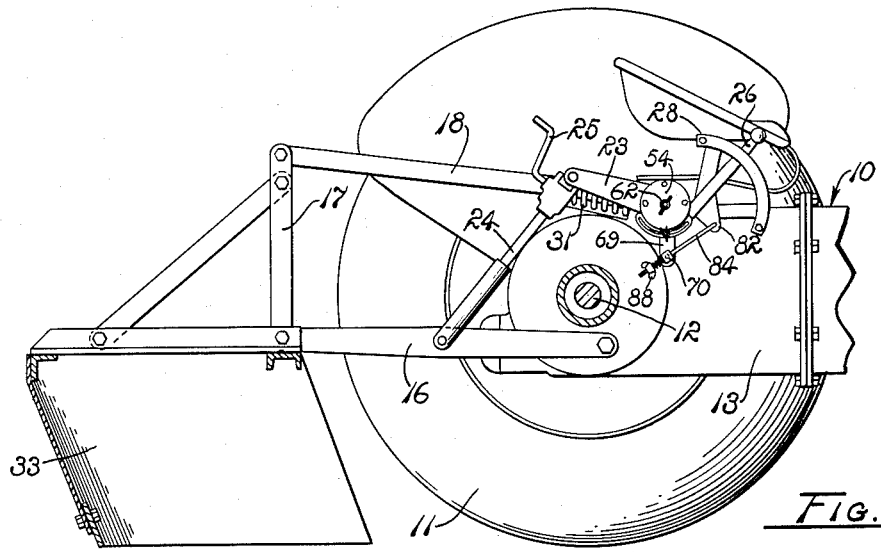
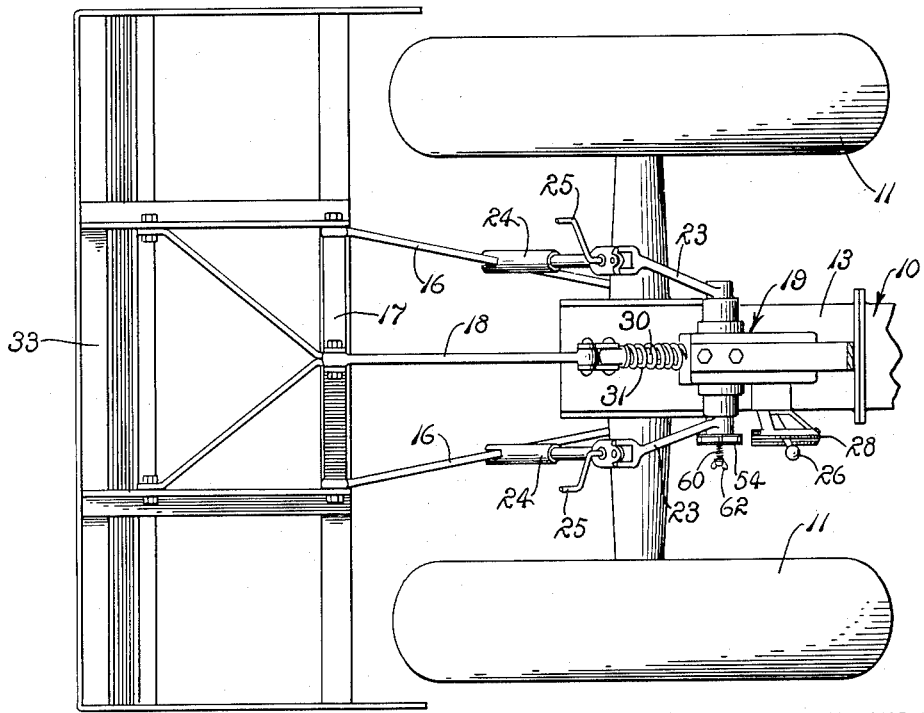
HENRY K. HIRASUNA
INVENTOR
HUEBNER, BEEHLER,
WORREL & HERZIG
ATTORNEYS June 12, 1956   H. K. HIRASUNA   2,749,825
AUXILIARY MONITORING CONTROL ATTACHMENT FOR TRACTORS
Filed March 31, 1952   2 Sheets-Sheet 2

HENRY K. HIRASUNA
INVENTOR
HUEBNER, BEEHLER,
WORREL & HERZIG
ATTORNEYS

United States Patent Office 2,749,825
Patented June 12, 1956

2,749,825

AUXILIARY MONITORING CONTROL ATTACHMENT FOR TRACTORS

Henry K. Hirasuna, Fresno, Calif.

Application March 31, 1952, Serial No. 279,645

4 Claims. (Cl. 97—46.07)

The present invention relates to power driven agricultural equipment and more particularly to an auxiliary monitoring attachment for use on tractors having means for the attachment of agricultural implements thereto, power operated control units for moving said attaching means up and down with reference to the tractor, and control levers connected in controlling relation to the power operated unit whereby automatic elevational control of the attaching means is effected with greater precision than heretofore attempted.

Although a large number of automatic control systems for tractors to which agricultural implements are coupled have recently been developed and have proved of great advantage to farmers, such systems are subject to certain disadvantages which the present invention seeks to overcome. Automatic control systems of the general character to which the subject invention relates are typified by Patents No. 1,501,651, No. 1,687,719, and No. 2,118,181, to Ferguson.

With even the most advanced automatic control systems, it is the normal experience that variations in soil quality and moisture content, obstructions in the soil, and variations in terrain cause an elevational movement of implements attached to tractors equipped with the control systems commonly referred to as bobbing. It frequently occurs in such systems, that automatic compensation for increased depth of earth engagement of an agricultural implement from the desired depth occurs subsequent to the need therefor and frequently at an instant in which the implement has suddenly raised and the opposite effect desired.

An object of the present invention is to provide an improved control system of the character described.

Another object is to provide an auxiliary monitoring attachment available for use in conjunction with conventional control systems of the character described to attain improved adjustability and precision of operation.

Other objects are to provide an auxiliary monitoring attachment that is economical to construct, conveniently and easily installed on conventional control systems, and thoroughly effective in its operation.

A further object is to provide an auxiliary monitoring attachment which when properly installed permits an operator, through the regulation of a control lever, accurately to set an agricultural implement at a predetermined depth.

Further objects and advantages will become apparent in the subsequent description in the specification.

In the drawings:

Fig. 1 is a fragmentarily longitudinal section of a tractor having a scraper coupled thereto showing the auxiliary monitoring attachment of the subject invention utilized in the tractor.

Fig. 2 is a fragmentary plan view of a tractor having an operator supporting seat removed therefrom for illustrative convenience and showing a scraper coupled to the tractor.

Figure 3:
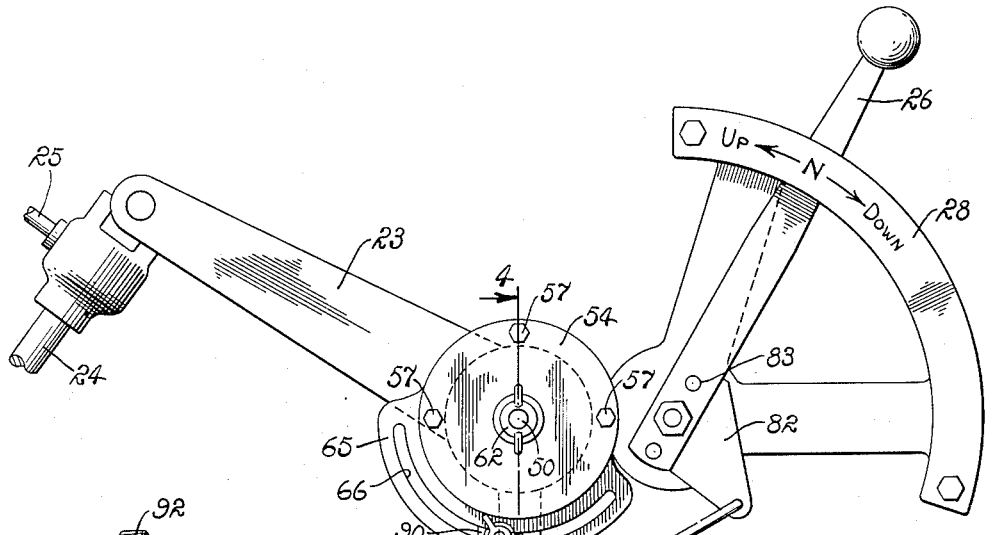
Fig. 3 is an enlarged side elevation of the device of the present invention shown in association with certain environmental structure for illustrative convenience.
Figure 5:
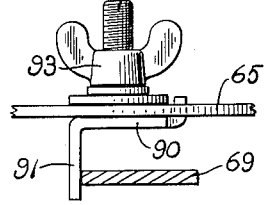
Fig. 5 is a section taken on line 5—5 of Fig. 3.

Referring in greater detail to the drawings:

A tractor 10 is fragmentarily represented in Figs. 1 and 2 providing a pair of rear drive wheels 11, a rear axle 12, and a transmission housing 13.

The tractor is provided with implement attaching means including a pair of rearwardly directed lift arms 16 pivotally mounted on the transmission housing 13, an A-frame 17 borne in a substantially erect position by the rearwardly extended ends of the arms 16 and by an upper link 18 pivotally interconnecting an upper portion of the A-frame and a control system 19 of the tractor.

Figure 7:
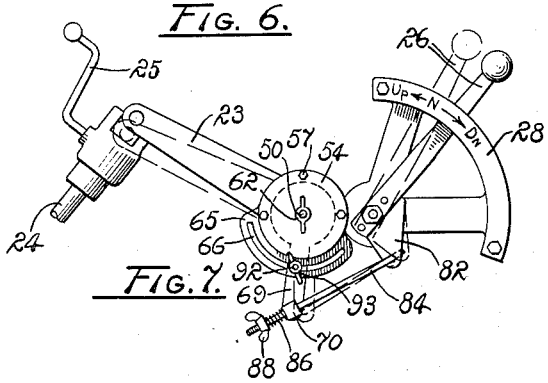
Fig. 7 is a view somewhat similar to Fig. 3 at a reduced scale illustrative of various operational positions of elements shown therein.

The control system may take any of a number of well known forms, such as that set forth in the Ferguson patents to which reference has been made. For purposes of brevity, reference is made only to those portions of the control system which co-act with the auxiliary attachment of the present invention. The control system includes a rock shaft 22 rotatably mounted transversely of the tractor 10 in the transmission housing 13. Radius arms 23 are radially extended from opposite ends of the rock shaft 22 in elevationally spaced relation to the arms 16. Elevating links 24 pivotally interconnect the radially extended ends of the radius arms 23 with their respective lift arms 16. The elevating links are usually telescopically adjustable by manipulation of cranks 25 provided for the purpose. Any suitable means, not shown, is provided in controlling connection to the rock shaft 22 whereby it may be rotated to raise and to lower the radius arms 23 and thus, the lift arms 16. It is a well known practice to provide an hydraulic ram connected to the rock shaft which is adjustably controlled by a valve connected to the ram and to a source of hydraulic fluid under pressure. For purposes of the present invention, it is adequate to observe that any suitable powered means for rotatably positioning the rock shaft 22 is provided and has controlled connection to a control lever 26 pivotally mounted on the tractor forwardly adjacent to the rock shaft. It is also of aid to an understanding of the present invention to observe that the control lever has a central neutral position designated by the letter "N" in Figs. 3 and 7, a position rearwardly thereof to which the lever is positioned in a counterclockwise direction, as viewed in Figs. 3 and 7, to raise the rearwardly extended ends of the lift arms 16, and a forwardly pivoted position to which the lever is pivoted to lower the lift arms. The neutral position should not be considered to be a precisely fixed point. It varies according to the load pulled by the tractor as determined by the lever position. As the lever is moved downwardly, the neutral position is shifted somewhat in the same direction. It is appropriate to observe, however, that the neutral position always exists and is found between the raising and lowering positions of the lever.

A sector bracket 28 is usually provided in association with the control arm 26 and visual indication made thereon of the effects of various positioning of the control arm.

If desired, the forward end portion of the link 18 can be coupled to a control rod 30 which is urged into a predetermined rearwardly extended position by a compression spring 31 of the character shown and described in the patent to Ferguson, No. 2,118,181. The rod, in a manner not shown, is coupled to the described control system within the transmission housing 13 so that sudden and inadvertent movement of the rearward end portions of the lift arms 16 downwardly neutralizes the control system so as to avoid rearward tipping of the tractor 10. This feature is not essential to the applicant's invention but is suitable employed therewith and serves clearly to demonstrate the improvements of the present invention over the prior devices employed for implement control purposes.

A scraper 33 or other implement is connected to the A-frame 17 for adjustable elevational movement on the tractor 10 in response to manipulation of the control lever 26.

The structure described to this point is conventional and constitutes an operational environment for the subject invention. As conventionally employed, the control lever 26 is drawn rearwardly to raise the scraper 33, or other implement, and thrust forwardly to lower the scraper into earth engagement. During operation, variations in soil quality, moisture content, and the like, causes the scraper elevationally to depart from the desired depth of earth engagement in undesirable bobbing or hunting action. While previously known automatic control systems, such as those referred to, are sometimes considered to be automatic depth controls they are not accurately so designated. They are capable of modifying the depth of earth engagement of an earth working tool in response to resistance to movement offered by the tool but are incapable of maintaining precise depth of earth engagement as resistance to movement varies because of soil variations and the like.

Attention is now directed to the applicant's device most clearly shown in Figs. 3 to 7, both inclusive. An annular cup-shaped base member 38 having a concentric opening 39 therethrough is positioned against an extended end of the rock shaft 22 adjacent to the control lever 26. The extended end of the rock shaft is provided with screw threaded bores 40. The base member is rigidly mounted on the rock shaft 22 for unitary rotational movement therewith by means of a circular plate 41 fitted into a pocket 42 provided in the base member and in overlaying relation to the opening 39. Headed bolts 43 are extended through the plate and tightened into the screw threaded bores 40. If desired, a locking member 44 of sheet metal or the like can be provided between the heads of the bolts 43 and the plate 41 and turned up against the heads, as at 45 to preclude inadvertent displacement of the bolts.

A circular plate 48 is positioned on the base member in covering relation to the heads of the bolts 43 concentrically of the rock shaft and provides an outwardly disposed clutch surface 49. A pintle rod 50 is weldably secured to the plate 48 and outwardly extended therefrom coaxially of the rock shaft.

A pair of circular clutch disks are mounted on the pintle rod 50 against the clutch surface 49 of the plate 48. The applicant prefers to employ cork for the clutch disks but obviously, other friction material may be utilized as desired. A holding plate 53 is positioned against the outer clutch disk on the pintle rod 50. An annular cover 54 having a central opening 55 is positioned against the plate 53 with the pintle rod 50 extended through the opening 55. Spacer sleeves 56 are mounted between the plates 48 and 53 and headed bolts 57 extended through the cover 54, plate 53, plate 48, and screw-threadably mounted in the base member 38, assembling said elements in unitary relation and precluding relative rotational movement thereof. Openings 58 are provided in the plate 53 for slidable movement of the plate longitudinally of the sleeves while constrained to unitary rotational movement of the plate with the base member 38.

A compression spring 60 is mounted on the pintle rod 50 and has an inner end engaged against the plate 53 and an outwardly disposed end. A centering washer 61 is slidably mounted on the pintle rod 50 in engagement with the outer end of the spring and the spring adjustably compressed against the plate 53 by means of a wing nut 62 screw-threadably mounted on the pintle rod in engagement with the centering washer.

Figure 4:
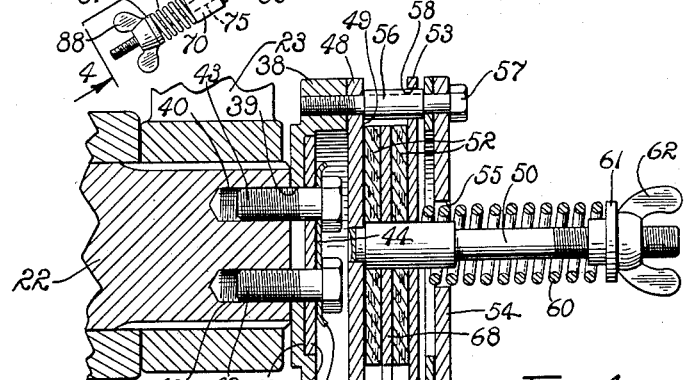
Fig. 4 is a section taken on line 4—4 of Fig. 3.
Figure 6:
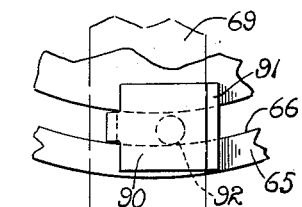
Fig. 6 is a somewhat enlarged fragmentary elevation as viewed from line 6—6 of Fig. 4.

An annular sector bracket 65 is clamped between the outer ends of the spacing sleeves 56 and the cover 54, as shown in Fig. 4. The bracket is downwardly extended from the cover and provides an arcuate slot 66 therein concentrically of the pintle rod. The bracket may be formed integrally with the cover, if desired.

A circular slip plate 68 is rotatably mounted on the pintle rod 50 between the clutch disks 52 and has an arm 69 radially extended therefrom transversely of the slot 66. A slide block 70 is pivotally mounted on the extended end of the arm 69 as by a pin 71 extended therefrom through the arm. The slide block provides a surface 72 engaged against the arm 69. A washer 73 is provided on the pin 71 against the arm 69 opposite to the slide block and a cotter pin 74 or other suitable means utilized to hold the pin in the arm. The slide block provides a bore 75 therethrough transversely related to the pin 71.

A bracket 82 is rigidly mounted on the control lever 26 and downwardly extended therefrom adjacent to the arm 69 as by means of headed bolts 83 extended through the bracket and tightened into screw-threaded bores tapped into the control lever.

A push-pull rod 84 is pivotally connected to the bracket 82 and slidably extended through the bore 75. A stop collar 85 is mounted rigidly on the rod for engagement with the slide block 70. A helical spring 86 is mounted on the rod 84 in engagement with the slide block 70 oppositely from the collar 85 and adjustably compressed against the slide block by means of a centering washer 87 mounted on the rod with a wing nut 88 tightened thereagainst.

A stop 90 is slidably mounted in the slot 66 and has a flange extended into the path of movement of the arm 69 rearwardly of the arm. A bolt 92 is rigidly mounted in the stop, as by welding, and extended through the slot. A wing nut 93 screw-threadably mounted on the bolt 92 for tightening against the sector bracket 65 provides dependable securing of the stop in adjusted position in the slot.

*Operation*

The only modification of the conventional structure described required to mount the auxiliary monitoring attachment of the present invention is the provision of the screw-threaded bores 40 in the rock shaft 22 and the provision of screw-threaded bores in the control lever 26 to receive the bolts 83 in mounting the bracket 82. The attachment is partially disassembled for mounting convenience by removing the wing nut 62 to relieve the compression of the spring 60 and by removing the headed bolts 57, so that access can conveniently be had to the interior of the base member 38. The headed bolts 43 are extended through the locking member 44, the plate 41, and tightened into the bores 40 with the plate nested in the cup-shaped portion 39. The locking member 44 is bent upwardly against the heads of the bolts 43 and the plate 41, sleeves 56, plates 48 and 52, and cover 54, assembled as described. The wing nut 62 is tightened to achieve the desired frictional engagement of the slip plate 68 between the clutch disks 52 and the plates 48 and 53.

The bracket 82 is mounted for unitary movement with the control lever 26 and the push-pull rod 84 connected between the bracket and the slide block 70 in the manner described. The stop 90 is mounted in the sector bracket 65 rearwardly adjacent to the control arm 69. The positioning of the stop may be determined by trial and error methods and such positioning aided by the provision of a scale adjacent to the slot 66, if desired. At any event, the stop is provided in a position which has previously been determined as appropriate for the depth of earth engagement desired by the scraper 33 or other implement.

When the tractor 10 is driven to an area of operation, it is done so with the scraper 33 in an elevated position readily achieved by moving the control lever 26 rearwardly.

To initiate operation, the control lever 26 is thrust forwardly and downwardly to the limit permitted by engagement of the control arm 69 with the stop 90 and promptly released. Obviously, the control lever cannot of itself directly rotate the rock shaft 22 and the pivotal movement of the control lever serves to slip the plate 68 between the clutch disks 52 to establish a predetermined controlling relation between the control lever 26 and the rock shaft. When the control lever is released, the frictional engagement of the clutch disks 52 with the slip plate 68 and/or the plates 48 and 53 continues to hold the control lever in depressed position causing the conventional control means to rotate the rock shaft 22 to lower the lift arms 16 and thus the scraper.

As the rock shaft 22 is rotated in a counter-clockwise direction, as viewed in Fig. 3, control lever 26 is gradually returned to neutral position progressively reducing the rate of rock shaft movement until neutral position is reached, at which point the rock shaft is held in a fixed position with the scraper 33 in a predetermined elevational position. Neutral position is intended to mean, by definition, that position of the lever at which the rock shaft will be held in fixed position unless rotated by the automatic features of the Ferguson or other conventional system by changes in the extent of resistance to tool movement through the earth.

If, during the course of operation, the scraper 33, or other agricultural implement, descends below the preferred depth of earth engagement because of variations in soil quality or moisture content, or the engagement of an obstruction, the radius arms 23 are drawn downwardly rotating the rock shaft 22 in a counter-clockwise direction, as viewed in Figs. 3 and 4. Rotation of the rock shaft is communicated through the frictional engagement of the clutch disks 52 with the plates 48 and 53 and with the slip plate 68 into forward movement of the lower end of the control arm 69 thrusting the control lever 26 upwardly. Movement of the control lever 26 upwardly serves to condition the conventional control system 19 to rotate the rock shaft 22 against the tendency of the scraper to descend below the predetermined desired depth. As the scraper returns to its preferred elevation relative to the tractor, the control lever is returned to neutral position so that as soon as its return is completed, the control system 19 is neutralized and no further automatic movement of the scraper effected other than in compensation for subsequent inadvertent displacement from predetermined depths. Conversely, inadvertent elevating of the scraper serves to thrust the control lever 26 downwardly and similarly to return the scraper to desired depth of earth engagement.

It will be obvious that the stop 90 may be optionally employed. It has the advantage of providing a predetermined guide whereby the scraper 33 is conditioned for operation at a specific elevation relative to the tractor.

When it is desired to withdraw the scraper 33 from earth engagement, the control lever 26 is manually drawn upwardly and rearwardly and released. Movement of the control lever causes the slip plate 68 to rotate on the pintle rod 50 to a new adjusted position. The control system 19 then operates to raise the lift arm 16 and the scraper 33 until the control lever 26 is automatically returned to neutral position by such raising movement. It will be noted that the tractor operator need only initially position the control lever 26 to raise or to lower any tool coupled to the tractor by means of the A-frame 17.

Once set, the auxiliary monitoring attachment of the present invention automatically maintains the scraper at a depth or an elevation predetermined by the extent of initial movement of the control lever 26 and adjustable repositioning of the slip plate 68.

Any wear to which the clutch disks 52 may be subjected can readily be compensated for by the tightening of the wing nut 62 on the pintle rod and thus increasing the compressing effect of the spring 60.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and structures.

Having described my invention, what I claim as new and desire to secure by Letters Patent is:

1. In a tractor having means mounted thereon for adjustable elevational movement adapted for attachment of an agricultural implement thereto, a power operated control unit connected to the attaching means adapted to raise and to lower the attaching means including a shaft rotated in response to raising and lowering movement of the attaching means relative to the tractor, and a control lever having controlling connection to the control unit; a friction clutch mounted on the shaft for unitary rotational movement therewith having an arm radially extended therefrom movable relative to the shaft by overcoming friction of the clutch, a push-pull rod interconnecting the arm and the control lever for corresponding movement, and a stop adjustably mounted on the friction clutch engageable with the arm to limit movement of the arm relative to the shaft.

2. The combination of a tractor, a tool bar mounted on the tractor for adjustable elevational movement, a power operated control unit connected to the tool bar adapted to elevate and to depress the tool bar relative to the tractor, the control unit including a shaft rotatably mounted transversely of the tractor rotated in response to elevational movement of the tool bar relative to the tractor, a control lever pivotally mounted on the tractor for movement about an axis in substantially parallel relation to the shaft and having controlling connection to the control unit, a frictional clutch mounted on the shaft adjacent to the lever for unitary rotational movement with the shaft and having an arm radially extended therefrom for movement relative to the shaft upon overcoming the friction of the clutch, a bracket arm connected to the control lever adjacent to the arm, a push-pull link pivotally interconnecting the bracket arm and the clutch arm, a sector bracket mounted rigidly concentrically on the shaft, adjacent to the clutch arm, and a stop adjustably positioned on the sector bracket for clutch-arm engagement.

3. In a tractor having means for attachment of an agricultural implement thereto, a power operated control unit for raising and lowering said attaching means relative to the tractor including a control shaft rotatably mounted transversely of the tractor rotated in response to elevational movement of the attaching means, and a control lever pivotally mounted on the tractor for movement about an axis substantially parallel to the shaft having controlling connection to the control unit and having a central neutral position, a forwardly pivoted position for elevating the attaching means, and a rearwardly pivoted position for lowering the attaching means; the combination of a base member mounted on the shaft for unitary rotational movement therewith, a pintle rod extended from the base member axially of the shaft, a pair of friction disks mounted on the pintle rod against the base member, a slip plate rotatably mounted on the pintle rod between the disks and having a control arm downwardly extended therefrom adjacent to the control lever, a bracket arm mounted on the control lever and downwardly extended therefrom, a push-pull linkage interconnecting the bracket arm and the control arm for corresponding pivotal movement thereof, a compression plate mounted on the pintle rod against the outer friction disk, means mounted on the pintle rod urging the compression plate against the outer disk, means interconnecting the base member and the compression plate for corresponding rotational movement with the shaft, a sector bracket mounted on the compression plate adjacent to the arm, and a stop adjustably positionable on the sector bracket rearwardly of the control arm having a portion disposed in the path of movement of the arm to limit rearward travel of the arm and slippage of the arm's slip plate relative to the shaft in response to forward thrust of the control lever.

4. In a tractor having means mounted thereon for adjustable elevational movement adapted for attachment of an agricultural implement thereto, a power operated control unit connected to the attaching means adapted to raise and to lower the attaching means relative to the tractor including a shaft rotated in response to raising and lowering movement of the attaching means, and a control lever mounted for pivotal movement on the tractor about an axis substantially parallel to the shaft and adjacent thereto having controlling connection to the control unit; a base member mounted on the shaft for unitary rotational movement therewith and providing a circular flat face surface axially disposed concentrically from the shaft, a pintle rod rigidly mounted on the base member and extended therefrom concentrically of the face surface, a pair of circular friction disks mounted on the pintle rod against the face surface of the base member, a circular slip plate rotatably mounted on the pintle rod between the friction disks and having an arm radially extended therefrom, a circular compression plate slidably mounted on the pintle rod in engagement with the outer friction disk, means interconnecting the base member and the compression plate for corresponding rotational movement with the shaft, a compression spring mounted on the pintle shaft having an end engaged against the compression plate and an outwardly disposed end, means mounted on the extended end of the pintle rod in engagement with the outer end of the compression spring compressing the spring against the compression plate, a sector bracket mounted rigidly with the compression plate having an arcuate slot therethrough concentrically of the pintle shaft and adjacent to the arm, a stop having a base slidably mounted in the slot and having an extension disposed within the path of movement of the arm, means securing the stop in adjustable positions in the slot, and a push-pull linkage interconnecting the arm and the control lever for corresponding pivotal movement.

References Cited in the file of this patent

UNITED STATES PATENTS

| | | |
|---|---|---|
| 1,793,786 | Emmons | Feb. 24, 1931 |
| 2,118,180 | Ferguson | May 24, 1938 |
| 2,540,429 | Cordes | Feb. 6, 1951 |
| 2,552,726 | Larson | May 15, 1951 |
| 2,618,167 | Seifert | Nov. 18, 1952 |